Figure 1:
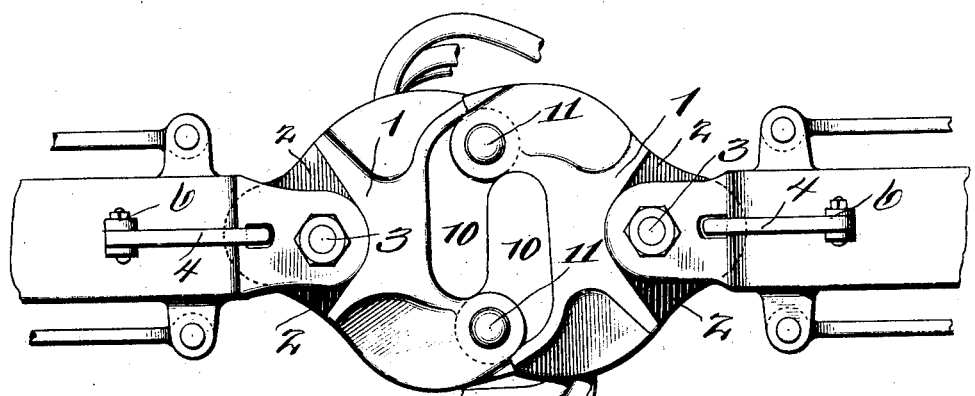

No. 838,103. PATENTED DEC. 11, 1906.
W. W. GORDON.
CAR AND AIR BRAKE HOSE COUPLING.
APPLICATION FILED AUG. 15, 1906.

2 SHEETS—SHEET 1.

Witnesses
R. A. Boswell
E. A. Bond

Inventor
W. W. Gordon

By W. E. Boulter
Attorney

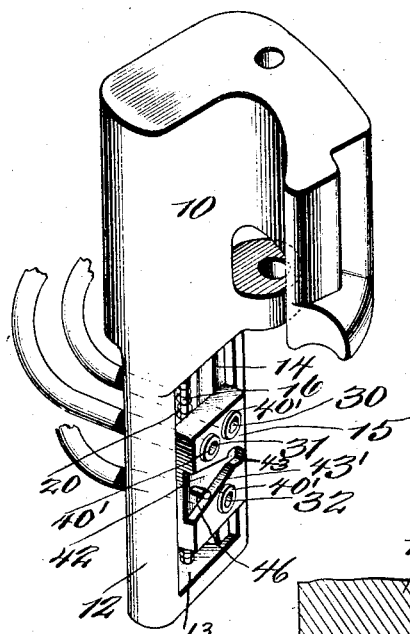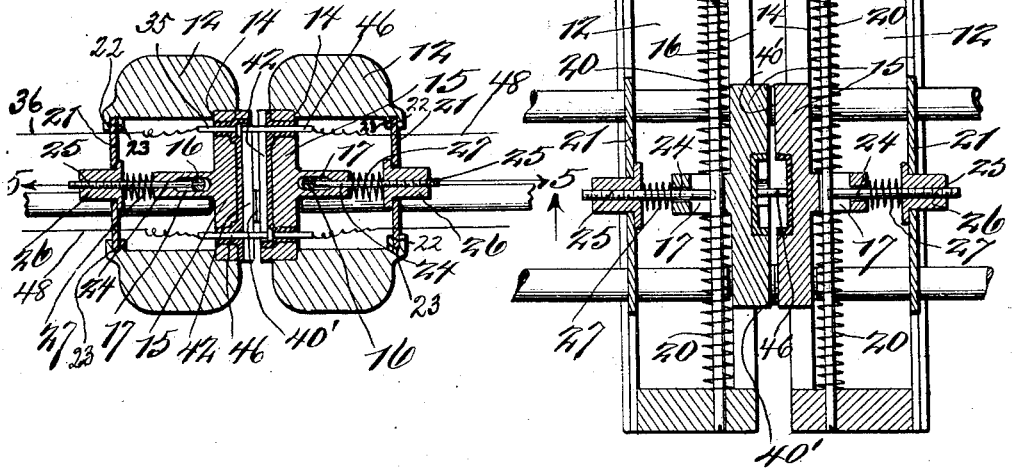

UNITED STATES PATENT OFFICE.

WILLIAM W. GORDON, OF WASHINGTON, DISTRICT OF COLUMBIA.

CAR AND AIR-BRAKE HOSE-COUPLING.

No. 838,103.　　　　Specification of Letters Patent.　　　　Patented Dec. 11, 1906.

Application filed August 15, 1906. Serial No. 330,724.

*To all whom it may concern:*

Be it known that I, WILLIAM W. GORDON, a citizen of the United States, residing at Washington, in the District of Columbia, have invented certain new and useful Improvements in Car and Air-Brake Hose-Couplings, of which the following is a specification.

My invention relates to a combined car and air-brake, signaling, and steam hose-coupling, and it relates particularly to a construction of coupling-knuckle such as is used in the Janney type of couplings, whereby when two adjacent cars are being coupled together the connection of the adjacent ends of the usual air-brake signaling and steam hose or pipes will be effected simultaneously.

My invention has primarily for its object to provide the usual swinging coupling-knuckle of a car-coupling of the Janney type with means for establishing connection between the adjacent ends of air-brake hose or pipe, signaling-hose, and steam-hose such as are used in the present railway-car equipment, the said connection being automatically established during the act of coupling two cars together, whereby I avoid any necessity of a trainman going between two cars to establish such connection as is at present the case.

A further object is to automatically establish connection between the adjacent ends of wires for carrying electric current so that the cars of a train may have electric supply for operating fans, supplying lights, or for other purposes, this automatic connection being effected during the act of coupling two cars together.

A further object of my invention is to provide a car-coupling the pivoted head of which when the cars are coupled will be latched in position and so maintained effectively, but which head may be unlatched and swung into an angular position relatively to the draw-bar when it is desired to couple on a curve, and which will be automatically latched again as soon as the cars reach a straight section of track.

Other objects and advantages of my invention will appear from the following description, when taken in connection with the accompanying drawings; and my invention consists in the novel construction, arrangement, and combination of parts, as hereinafter fully described, illustrated in the drawings, and pointed out in the appended claims.

Figure 2:
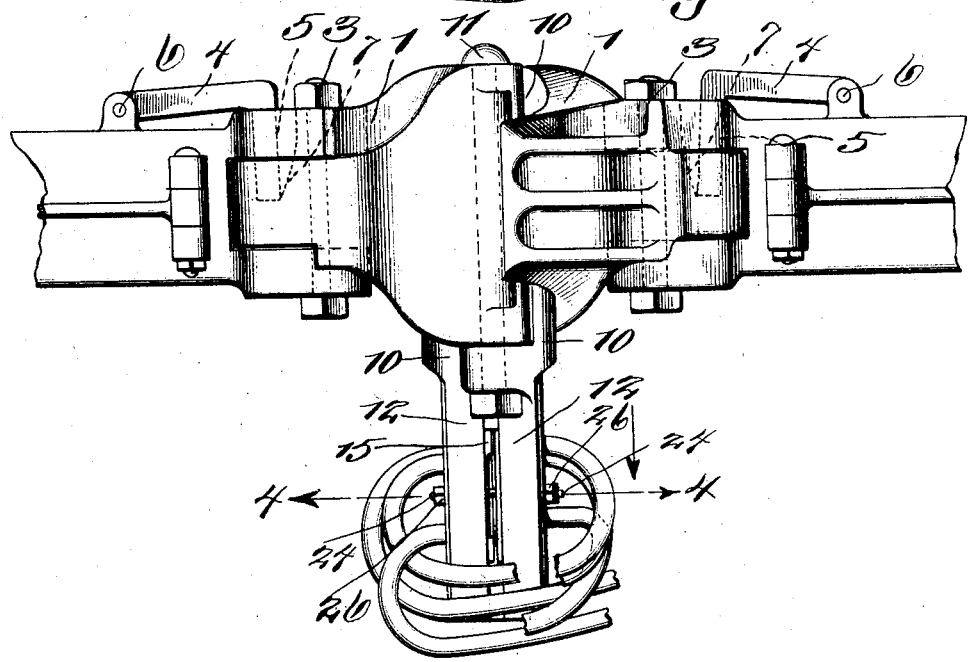

In the drawings, Figure 1 is a top plan view illustrating the invention. Fig. 2 is a side elevation showing the lower extensions of the coöperating knuckles. Fig. 3 is a perspective view of one of the knuckles. Fig. 4 is a section on the line 4 4 of Fig. 2. Fig. 5 is a section on the line 5 5 of Fig. 4.

1 indicates the head of a car-coupling, which in its general structure is similar to the heads of couplings of the Janney type. In the present instance the said head is cut away or recessed at its rear side on opposite sides of the draw-bar, as shown at 2. The head 1 is pivoted to the draw-bar at 3, as usual.

4 indicates a latch having a bent end or nose 5, the said latch being pivoted to the draw-bar, as at 6.

The head 1 is provided in its upper face at the rear with a notch or recess 7, into which the nose of the latch engages when the two cars are coupled together.

When it is desired to couple two cars on a curve, the latch is raised and the head swung around on its pivot into the desired position, the nose of the latch in the meantime resting upon the upper surface of the head. After the cars are coupled the nose of the latch will fall by gravity into the recess of the head as soon as the cars come upon a straight section of track, thus locking the head in position.

10 indicates the coupling-knuckle, which in its general structure is similar to the knuckles used in the Janney type of car-couplings, said knuckle being shown as pivoted by a bolt 11 to the head 1.

The knuckle is provided with an integral downwardly-projecting portion 12, having a vertical rectangular slot 13, the opposite sides of the portion 12 having parallel inwardly-projecting ribs or guides 14.

15 indicates a slide-block mounted to slide on the ribs 14, and 16 is a rod which has its ends secured in the knuckle.

The block 15 is provided with a slightly-elongated slot 17, through which loosely passes the rod whereby the block can slide upon said rod.

20 represents coiled springs mounted upon the rod at opposite sides of the block, the purpose of these springs being to normally hold the block at a central point in the length of said rod, but being adapted to yield when it is necessary for the block to slide in one direction or the other, due, for instance, to variations in the height of the adjacent cars.

Slidingly mounted on the extension is a plate or block 21, the opposite vertical edges or ends 22 of which enter grooves 23 in the extension. 24 is a rod carried by the block and passing through the block 21.

The outer end of the rod is threaded at 25 and carries a nut 26, against which bears one end of a coiled spring 27, mounted on the rod 24, and the opposite end of said spring bearing against the block 15. The function of the spring is to always press the block in a direction which will be toward and against the block carried by the adjacent car, which will thus effect a tight closure or sealing of the ends of the various hose-sections to prevent leakage of fluid from the latter. This arrangement also compensates for any wear of the parts which in time will occur, and thus preserves always a tight connection of the ends of said hose-sections. The block 15 is provided with three apertures 30 31 32, into which lead the ends of the brake, steam, and signaling-hose of the train, while in the block is arranged a pin 35, with which connects the end of an electric wire 36, adapted to supply electric current for the cars of the train for operating fans or for lighting purposes. In the apertures of the block are seated gaskets 40', which project slightly beyond the surface of the block. These gaskets are adapted to seat tightly against corresponding gaskets carried by the adjacent car, and when the various gaskets of one car are seated tightly against those of the adjacent car the connection between the various hose-sections is complete and no leakage between the gaskets can occur, owing to the stress of the springs 27 forcing the blocks of the adjacent cars toward each other.

One face of the block is cut away, as at 42, the recess thus formed being tapered, forming slanting shoulders 43', while joining the recess 42 is a recess 43, into which at the extreme end projects the end of the pin 35.

Projecting from the block at a point about centrally of the width of the recess 42 at its wider end is a pin 46, the function of which is to ride against one or the other of the shoulders 43' when the adjacent coupling-knuckles stand one slightly above the other and the shoulders direct the pins 46 of the adjacent couplings into the recesses 43 and cause the pins to make contact with the pins 35. Electric wires 48 are also connected with the pins 46, as shown, whereby to complete the electric circuit when the parts are in coupled position, as seen in Figs. 1 and 2.

Instead of employing the rod 16 and spring 27 for forcing the block 15 laterally any other means may be used. For instance, I might employ a bowed spring, the bowed portion of which bears against the block and the ends of said spring carrying rollers which run upon the portion 12. Thus the said bowed spring, which would be secured to the slide-block, would partake of the movements of the latter and at the same time exert a stress upon said block to force it laterally.

What I claim is—

1. The combination with a coupling-knuckle, of means carried thereby and constituting one terminal of an electric connection.

2. The combination with a coupling-knuckle, of a pin carried thereby and an electric conducting-wire connected with said pin.

3. The combination with a coupling-knuckle, of a block carried by said knuckle and movable vertically thereon and provided with an aperture for a purpose as set forth.

4. The combination with a coupling-knuckle, of a block carried by said knuckle and movable vertically thereon and provided with a plurality of apertures for the purposes as set forth.

5. The combination with a coupling-knuckle, of a block carried by said knuckle and movable vertically and transversely relatively to said knuckle, and provided with an aperture for a purpose as set forth.

6. The combination with a coupling-knuckle having a slotted downwardly-projecting portion, the opposite walls of which form guides, of a block mounted and adapted to slide upon said guides, and having an aperture adapted to receive one end of a hose-section, and also having an elongated aperture, a rod carried by the knuckle and passing through the elongated aperture of the block, coiled springs mounted upon the rod at opposite sides of the block and bearing against the latter, a second block slidingly mounted on the said projecting portion of the knuckle and having an aperture, a rod carried by the latter block, a nut adjustable upon the latter rod, and a coiled spring on the said rod bearing at one end on the nut and at the opposite end upon the first-mentioned block.

7. A coupling-knuckle and a slide-block carried thereby and movable vertically and laterally relatively thereto, said slide-block having apertures adapted to receive the ends of hose-sections.

8. A coupling-knuckle, a slide-block carried thereby and movable vertically and laterally relatively thereto, and having apertures to receive the ends of hose-sections, and gaskets seated in said apertures and projecting beyond the face of the slide-block.

9. A coupling-knuckle and a slide-block carried thereby and movable vertically and laterally relatively thereto and means for yieldingly pressing said block laterally.

10. A coupling-knuckle and a slide-block movable relatively to said knuckle, said block having apertures therein for the purposes set forth, in combination with a coupling-head to which said knuckle is pivoted and provided with a recess at its rear end and being cut away as at 2, a draw-bar to which said coupling-head is pivoted, and a latch pivoted to the draw-bar and adapted to engage in the recess in said head.

11. A coupling-knuckle and a slide-block movable vertically and laterally with respect to said knuckle and having apertures as described, means for pressing the slide-block laterally and means arranged above and below the slide-block and acting thereon to normally maintain the same against vertical movement.

12. A coupling-knuckle and a slide-block movable relatively to said knuckle, said slide-block being provided with a tapering recess and a pin projecting from said block and arranged at the wider end of the recess.

13. A coupling-knuckle and a slide-block movable relatively to said knuckle, said slide-block being provided with a tapering recess and a second recess joining the first, a pin projecting from said block and arranged at the wider end of the tapering recess, said slide-block being provided with apertures to receive the ends of air-brake, signaling and steam hose-sections and an electric conductor all as described.

14. A coupling-knuckle having an extension, a rod secured thereto, a slide-block loosely mounted upon said rod and provided with apertures as described and coiled springs mounted upon said rod and bearing upon the slide-block.

15. A coupling-knuckle having an extension, a rod carried by said extension, a slide-block having a slot through which said rod loosely passes, coiled springs upon said rod at opposite sides of the slide-block and bearing upon the latter, and a spring arranged to press said block laterally, said block having apertures as described.

In testimony whereof I affix my signature in presence of two witnesses.

WILLIAM W. GORDON.

Witnesses:
 CARRIE M. BOULTER,
 W. E. BOULTER.